United States Patent

[11] 3,593,595

[72] Inventor Eugene D. Taylor
 Kenosha, Wis.
[21] Appl. No. 851,282
[22] Filed Aug. 19, 1969
[45] Patented July 20, 1971
[73] Assignee J. I. Case Company

[54] DIFFERENTIAL GEARING MECHANISM AND METHOD OF ASSEMBLY
 5 Claims, 4 Drawing Figs.

[52] U.S. Cl. .................................................. 74/713
[51] Int. Cl. .................................................. F16h 1/40
[50] Field of Search ...................................... 74/713

[56] References Cited
 UNITED STATES PATENTS

| | | | |
|---|---|---|---|
| 941,101 | 11/1909 | Ross | 74/713 |
| 1,006,847 | 10/1911 | Heaslet | 74/713 |
| 1,185,174 | 5/1916 | Brush | 74/713 |
| 2,306,856 | 12/1942 | Ash | 74/713 X |

FOREIGN PATENTS

| | | | |
|---|---|---|---|
| 255,952 | 7/1926 | Great Britain | 74/713 |

Primary Examiner—Carlton R. Croyle
Assistant Examiner—Thomas C. Perry
Attorney—Dressler, Goldsmith, Clement and Gordon ABSTRACT: A differential gearing mechanism including pinion gears supported in a housing by a pinion support member. The support member comprises a central member having an axial opening and a pair of bores disposed on axes angularly related to the axial opening. The central opening receives a pin which also extends through coaxial openings in the housing and supports a pair of pinion gears. The support member further includes a pair of support elements respectively extending through further housing openings and each element has one end secured in a bore and the opposite end supported in an associated housing opening.

The differential gear mechanism is assembled by locating the pinions in the housing and aligning support pinion openings with respective housing openings, inserting the pin through coaxial housing openings and the central opening, and inserting the respective support elements through the remaining housing openings and securing the one end of the elements in the support member bore.

In a modified form, the central member includes a plurality of bores angularly related to each other and each receiving a pinion support element.

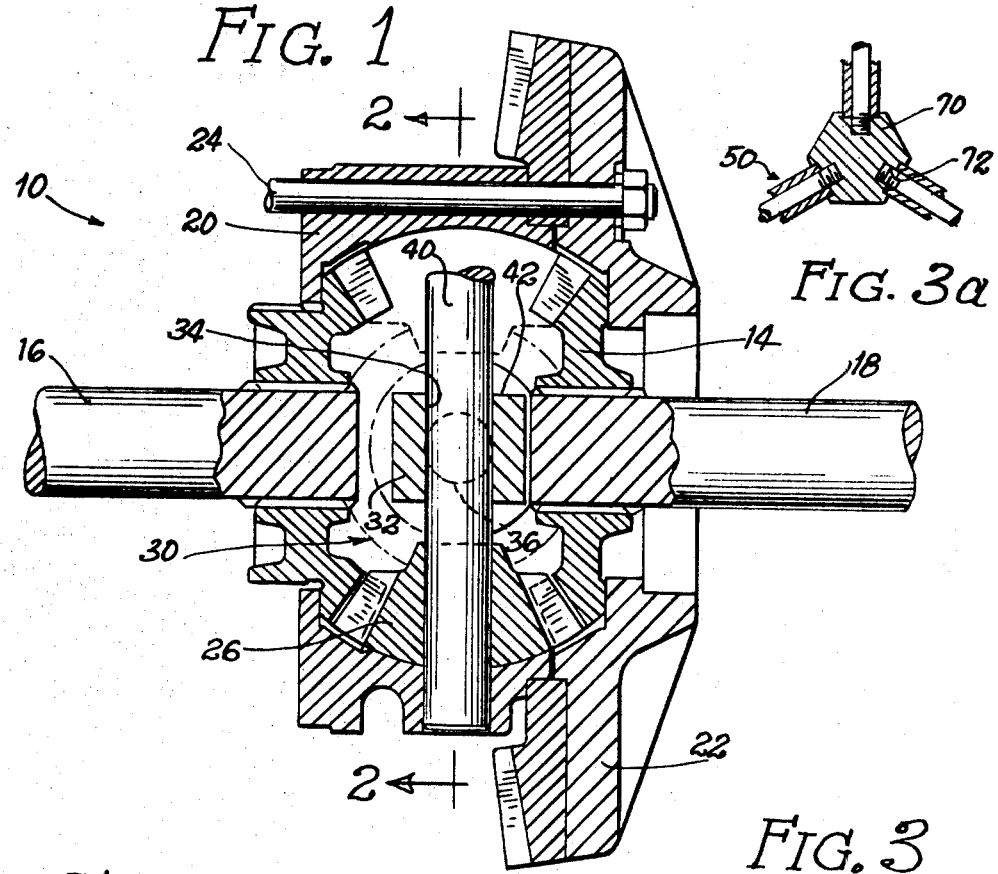
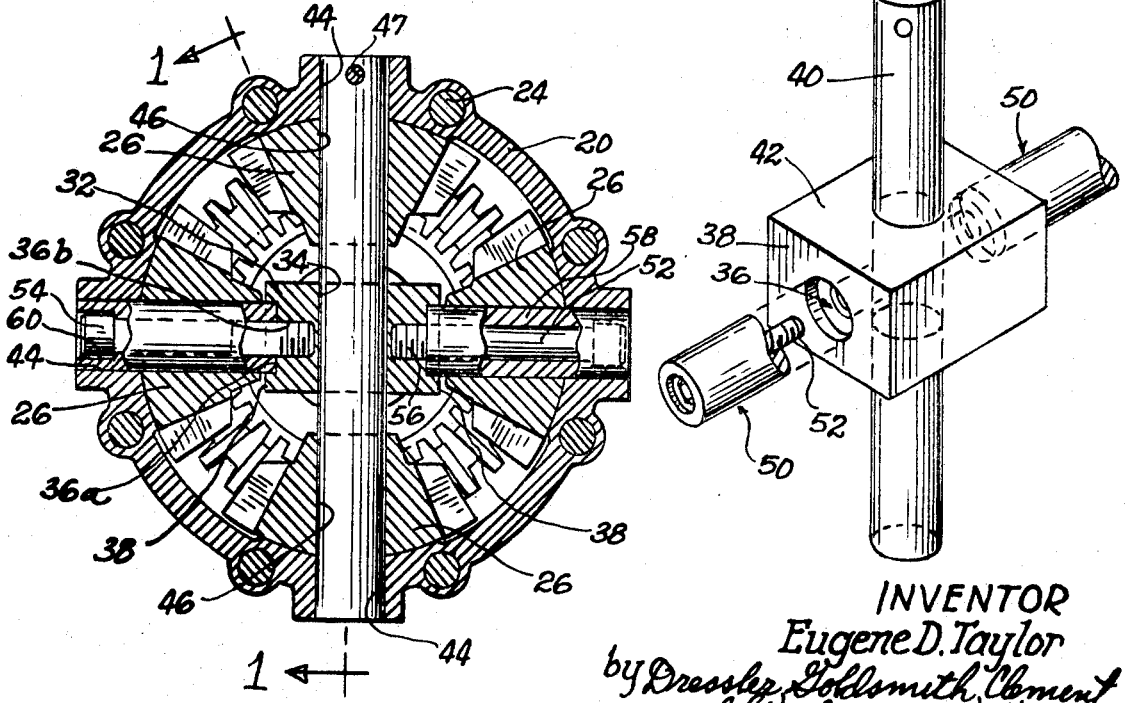

DIFFERENTIAL GEARING MECHANISM AND METHOD OF ASSEMBLY

BACKGROUND OF THE INVENTION

The present invention relates generally to differential gearing and more particularly to an improved pinion support for the pinion gears and an improved method of assembling the differential gearing mechanism.

Differential gearing is commonly used in motor vehicles to compensate for variations in speed of rotation of two different wheels driven from a common power source. Differential gearing of this type normally includes a pair of differential gears respectively connected to the axles of the respective driven wheels and a plurality of pinion gears, each in engagement with the respective differential gears and supported in a housing by a spindle support.

Two types of previously known differential gearing are respectively disclosed in U.S. Pat. Nos. 1,610,739 and 2,354,214. Both disclosures in these patents show a unitary spindle which is machined to provide for radially disposed stub shafts that respectively support pinion gears thereon and have their outer ends supported in a housing. The housing is of the split ring type construction and the two sections are normally bolted together and simultaneously bolted to a ring gear which is driven by a suitable input power source so that the entire housing, the differential gears, the axles and the wheels are simultaneously rotated as a unit when both wheels are rotating at the same speed.

While such differential gearing mechanism has been used for years, there still remains room for substantial improvements in simplifying the construction and assemblage of the various parts forming the differential gearing mechanism.

SUMMARY OF THE INVENTION

The present invention provides a simple, inexpensive pinion gear support mechanism which can be made with relatively little machining operation. The simplified pinion gear support member is also constructed and assembled in a manner so that the entire casing or housing may be formed of a unitary construction and still allow the entire mechanism to be assembled in a series of very simple and nontechnical steps.

The differential gearing mechanism of the present invention includes a housing adapted to surround a plurality of differential gears and support a plurality of pinion gears, each of which is in mesh with the respective differential gears. The pinion support mechanism or member includes a central member having an opening extending therethrough and a plurality of bores which have axes that are angularly related to the axis of the opening extending through the member. The support member further includes a pin which extends through the central opening and has opposite ends received in openings formed in the housing with the housing openings being coaxial with the central opening on the support member. The housing further includes a plurality of openings sufficient in number to the number of bores in the support member. Each of the bores receives one end of a pinion support element which is fixedly secured therein, as by threading, and has its opposite end received in the housing opening. A pair of the pinion gears within the housing are supported adjacent opposite ends of the pin and the remaining pinion gears are supported by respective ones of said support elements.

The method of assembling the differential gearing mechanism includes the steps of inserting a plurality of pinion gears, equal in number to the number of openings in the support housing, aligning the central opening of the supporting member with a pair of axially aligned openings, inserting the pin through one of the housing openings, through the central opening in the supporting member and through the opposite coaxial housing opening to thereby secure two pinion gears within the housing. Each of the subsequent pinion gears is then secured within the housing by inserting the support elements through each of the remaining openings and securing the inner ends of the support element within the bore, as by threading the element into the bore opening.

A modified form of the central member is also contemplated for three pinion gears and in which the central member has a plurality of threaded openings angularly related to each other and each threadedly receiving one end of a support element with the opposite end supported in a housing opening.

Thus, the entire assembly can be simply and effectively accomplished without the necessity of having the heretofore conventional split ring housing and the entire assembly can be made up of parts which require virtually no machining to close tolerances. In fact, it should be noted that all of the elements forming part of the supporting member, with the exception of the central member, are conventional type of shelf items and need not be machined for a special purpose.

BRIEF DESCRIPTION OF DRAWINGS

FIG. 1 of the drawings discloses a vertical sectional view taken generally along lines 1-1 of FIG. 2 and showing the differential gearing mechanism constructed in accordance with the present invention;

FIG. 2 is a vertical sectional view taken generally along lines 2-2 of FIG. 1;

FIG. 3 is a perspective view of the pinion supporting member constructed in accordance with the present invention; and FIG. 3a is a sectional view of a slightly modified form of pinion supporting member.

DETAILED DESCRIPTION

FIGS. 1 and 2 of the drawings disclose a differential gearing mechanism 10 including a pair of differential gears 12 and 14 respectively splined or otherwise fixedly secured to shafts 16 and 18. The opposite ends of the shafts have the driving wheels of a vehicle (not shown) secured thereto. The differential gearing mechanism 10 further includes a housing 20 which is fixedly secured to a ring gear 22 as by bolts 24. The ring gear 22 is adapted to be driven by power source of the vehicle in a manner which is well known in the art and need not be described herein in detail.

The differential gearing mechanism 10 further includes a plurality of pinion gears 26, each of which is in meshing engagement with both of the differential gears 12 and 14. The differential gears are maintained in a fixed position within the housing 20 by a pinion gear supporting member 30 which forms a part of the novel aspect of the present invention.

As was indicated hereinabove, it has been rather standard in the differential gearing art to form the housing 20 in two sections which may be located on opposite sides of the pinion gear supporting member and which have arcuate recesses that define the supports for the ends of the supporting member. A most typical example of such an arrangement is disclosed in the above-mentioned U.S. Pat. No. 1,610,739. However, such an arrangement requires that the entire supporting member or spider must be accurately machined to provide the plurality of stub shafts for the respective pinion gears. Furthermore, the above arrangement dictates that the casing must be formed of two parts so that the one part of the housing may be disposed on one of the differential gears. Thereafter, the spider or pinion gear supporting member with the pinion gears disposed thereon is located within the first half of the housing and the remaining part of the housing and the second differential gear are subsequently properly located and the entire unit is interconnected.

According to the present invention, the pinion gear supporting member includes a plurality of parts which may be readily formed without the heretofore necessary machining operation and which can be assembled within the housing of the differential so that the housing may be formed of a unitary structure.

As more clearly illustrated in the drawings, the pinion supporting member 30 includes a central member 32 having an axially extending opening 34 extending therethrough. The central member 32 further includes a plurality of bores 36 which have axes that are angularly related to the axis of the central opening 34. In the illustrated embodiment, the bores 36 extend from each of a pair of opposed surfaces 38 parallel to the axis of opening 34 and include an enlarged portion 36a and a reduced area threaded portion 36b.

The pinion gear supporting member 30 further includes a pin 40 which extends through the opening 34 with opposite ends of the pin extending beyond further opposed surfaces 42 of the member 32. The opposite ends of the pin 40 are received in openings 44 which, in the assembled condition, are coaxial with or in alignment with the axis of the central opening 34. As more clearly shown in FIGS. 1 and 2, the portions of the pin or pinion supporting means 40 which are disposed between the respective openings 40 and 44 each support a pinion gear 26 by having the pin extend through support openings 46 defined in the respective pinion gears. The pinion supporting means 40 may be retained in the openings by lock means in the form of a retaining pin 47 extending through aligned openings in the housing 20 and the pin 40.

The remainder of the pinion gear supporting mechanism includes a plurality of support elements which are equal in number to the number of bores defined on the central support member 34. The support elements 50 are illustratively shown as a bolt 52 having an enlarged head 54 at one end thereof and its opposite end threaded at 56 so as to be capable of being fixedly secured into the bore 36b, which is preferably also threaded to receive the threaded portion of the bolt. The support element 50 further includes a sleeve 58, the peripheral surface of which defines the support for the pinion gear 26, and which has an enlarged area bore 60 at one end thereof adapted to receive the head 54 of the bolt 52.

The method of assembling the differential gearing mechanism constructed in accordance with the present invention requires a housing be formed which has a plurality of openings therein, a pair of the openings being disposed on a common axis. Subsequently the central member 32 is formed by forming a longitudinally extending opening through a block, and forming a plurality of threaded openings or bores having axes angularly related to the axis of the central opening 34.

Once the parts have been formed, the differential gearing mechanism is assembled by first locating one of the differential gears 12, 14 within the housing 20. Subsequently, all of the pinion gears 26 are located within the housing and respective ones of the support openings 46 are aligned with openings 44 defined in the housing. Thereafter, the central member is inserted within the housing so as to have the central opening 34 in alignment with a pair of coaxial openings 44 and the bores 36 in alignment with respective ones of the remaining housing openings 44. The central pin 40 is then inserted through the coaxially aligned openings 44 and the central opening or bore 34 while the support elements 50 are inserted in the remaining housing openings and fixed to the central support member with each of the support elements extending through a support opening 46 in the aligned pinion gear 26. The remaining differential gear 14 is then located in a proper position with respect to the pinion gears 26 and the ring gear is disposed thereon with the entire assembly being interconnected by the respective bolts 24.

In actual construction it is desirable to have the opening 34 of a slightly larger diameter than the diameter of pin 40 to accommodate slight misalignment between the housing openings and the central member bores.

It will be appreciated that the single pin or pinion supporting means 40 may be replaced by a pair of support elements 50. If this arrangement were desired, the central opening 70 would require securing means at opposite ends, such as a threaded portion on each end and an enlarged bore for receiving the sleeve 58. Alternatively, the central opening 34 could be replaced by a pair of aligned bores 36 extending into the end surfaces 42 of the polygonal member 32.

A slightly modified form of pinion supporting member 70 is shown in FIG. 3a and is particularly adapted for assembling a differential gearing mechanism having an odd number of pinion gears, such as three. The pinion supporting member 70 is a polygonal member having three bores 72 identical to the bores 36, in selected surfaces thereof and each receiving one end of a support element 50. The opposite ends of the respective support elements are supported in axially aligned housing openings and, as in the principal embodiment, are configured to be received through the housing openings and support openings 46 in pinion gears 26.

As can be appreciated from the above description, the present invention provides a simple and effective apparatus and method for assembling a differential gearing mechanism with a limited number of parts, most of which are conventional, commercially available items that can readily be procured without the necessity of special machining operations or special machinery for producing such parts. Also, the improved pinion gear supporting member, as well as the manner of assembling the member in the housing, allows the utilization of a unitary housing structure which greatly reduces the necessary inventory of the number of parts which must be stored and which must be made.

While the differential gearing mechanism has been illustratively disclosed as including four pinions, with respective pairs of pinions being disposed on common axes that extend substantially perpendicular to each other, it is readily apparent that any number of pinion gears may be incorporated into the mechanism by merely properly configuring the central member so as to be capable of producing additional threaded bores or openings 36 having axes angularly related with respect to the axis of the central opening 34.

What I claim is:

1. A pinion supporting member for supporting at least four pinion gears in a housing comprising a central member having an axial opening extending therethrough, said central member having two opposed surfaces extending parallel to said axis, said member further having threaded bores extending from each surface and angularly related to said axis; a pin having a central portion disposed in said opening and opposite ends extending beyond said member; and a pair of support elements, said support elements each comprising a bolt having one threaded end and an enlarged head on said opposite end, said threaded ends received in respective ones of said threaded bores; said support elements further including sleeves each having one end received in one of said bores and adapted to rotatably support a pinion gear, said opposite ends of said pin each adapted to support a pinion gear.

2. In combination with a differential gear housing and a plurality of pinion gears, pinion gear supporting mechanism comprising a central member having an axial opening extending therethrough, said member having a plurality of bores disposed on axes angularly related to said opening; means defining a pair of openings in said housing, said pair of openings having a common axis aligned with said axial opening; means defining further openings equal in number to the number of bores and each of said further openings being aligned with respective ones of said bores; a pin received in said pair of housing openings and said member opening, said pin supporting a pair of said pinion gears respectively disposed between said central member and respective ones of said housing openings; and a plurality of support elements equal in number to the number of said bores, each said support elements including a sleeve having an intermediate portion supporting a pinion gear and having an end portion received in a bore, each said support elements having an opposite end received in respective ones of said further openings, and threaded means maintaining said sleeves in said bores.

3. The combination as defined in claim 2, in which there are two threaded bores disposed on a common axis which extends substantially perpendicular to the axis of said member opening.

4. The combination as defined in claim 2, in which said member opening has a diameter slightly greater than the diameter of said pin.

5. In combination with a differential gear housing and at least three pinion gears, pinion gear supporting mechanism comprising a central member, said member having a plurality of angularly related surfaces equal in number to said pinions, said member further having a plurality of threaded bores equal in number to said pinion gears and located in respective ones of said surfaces; means defining a plurality of openings in said housing equal in number to said pinion gears with each opening axially aligned with respective ones of said bores; a pinion support element for each of said bores; said pinion support elements each including a sleeve having one end received in respective ones of said bores and having an opposite end supported in the aligned opening, said support elements each being configured to be received through a housing opening whereby said support elements may be inserted through said housing openings and support openings in said pinion gears and threaded into said bores; and threaded means extending through said sleeves and received in said bores for securing said sleeves to said members.